(No Model.)

T. D. JONES.
NUT LOCK.

No. 415,043.

Patented Nov. 12, 1889.

WITNESSES:
J. J. Laass
A. F. Walz

INVENTOR:
Thomas D. Jones
BY
Duell, Laass & Duell
ATTORNEYS

UNITED STATES PATENT OFFICE.

THOMAS D. JONES, OF SYRACUSE, NEW YORK.

NUT-LOCK.

SPECIFICATION forming part of Letters Patent No. 415,043, dated November 12, 1889.

Application filed March 19, 1889. Serial No. 303,878. (No model.)

*To all whom it may concern:*

Be it known that I, THOMAS D. JONES, of Syracuse, in the county of Onondaga, in the State of New York, have invented new and useful Improvements in Nut-Locks, of which the following, taken in connection with the accompanying drawings, is a full, clear, and exact description.

This invention relates to that class of nut-locks in which a piece of sheet metal is placed like a washer around the bolt beneath the nut and turned up at a projecting edge to engage the nut in some manner to prevent the nut from being unscrewed in service, and its object is to so shape the said piece of sheet metal that, first, when properly placed and forced into position it will engage an edge of a nut of any form with a clinging hold and act as a brace to draw the bolt home into its hole until its head rests firmly on the seat therefor; second, to crowd the free end of the bolt to one side of the hole and to hold it rigidly, so that it cannot be materially shaken in service, this shaking being the main cause of nuts working loose, and, third, to hold the nut by a direct brace on its edge from being turned loose, even by the enormous force exerted upon the bolts of fish-plates by the pounding of heavy and rapid engines.

To this end my invention consists in a piece of sheet metal shaped to form a nut-lock, as hereinafter described and claimed, reference being had to the accompanying drawings, in which—

Figure 1:
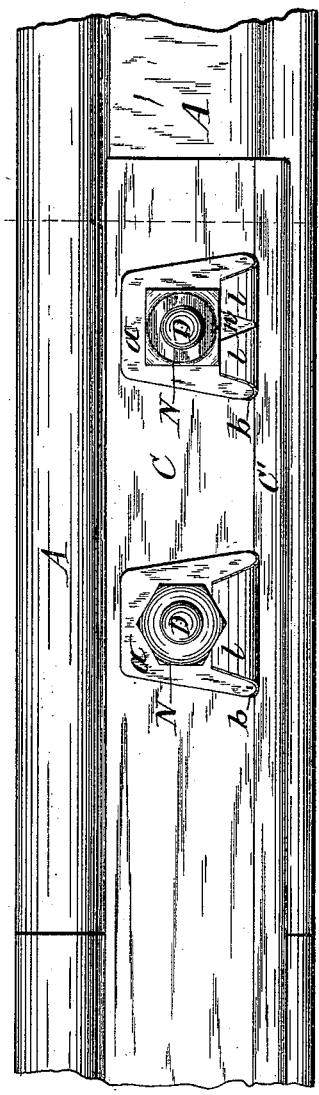
Figure 2:
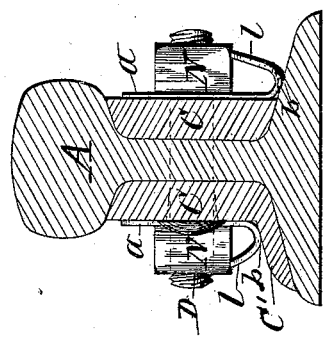

Figure 1 is a view of a portion of two railroad-rails joined by fish-plates and secured by bolts and nuts with my nut-lock in service. Fig. 2 represents a transverse vertical section of the same, showing two forms of fish-plates, with either of which my lock may be used.

A represents a railroad-rail; C C, two fish-plates; D, bolts passing through both plates and the web of the rail, as usual; and N represents nuts of any usual form—such as square, hexagon, &c.—screw-threaded upon the bolts to hold the fish-plates against the rails.

*a* represents my nut-lock, and it consists of a piece of sheet metal—preferably Bessemer steel—punched into shape like a washer. One edge of the washer is bent up, forming a lip *l*, and the line *b* of the bend is located at the exact distance from the central hole in the washer, which is required to fit the particular style of rail for which it is designed. When placed upon the bolt, the raised edge of the lip *l* is just far enough from the hole to permit the required nut to be screwed home on the bolt. Then the lip is first to be pried close against the side of the nut and afterward to be hammered or rammed with a bar on its outer face until it forms a firm brace between the flange of the rail and the nut. This bracing-lip is the main characteristic of my invention. It may be straight-edged to fit fairly against the side of a nut if a side happens to present itself when the nut is screwed home; or it may be provided with a suitably-shaped notch *n* to engage either a square or hexagonal corner if the corner happens to present itself to the lip. The plate is broad at the bend of the lip to form an elongated bearing to rest on the flange of the rail or fish-plate to prevent the lock from turning, and when the lip *l* is hammered firmly between the nut and the said flange the edge of the lip engages the side of the nut, and by its bracing action accomplishes three objects: First, it takes up the last bit of slack under the bolt-head by drawing the bolt through the fish-plates and rail until the bolt-head is firmly seated, and then holds it so; second, it bears the free end of the bolt to the upper side of the hole and holds it from being shaken, thus preventing the nut from being jarred loose, and, third, it holds the nut from being turned loose by any amount of force. So strong is this bracing-lip that if a powerful wrench be applied to a nut thus secured by my nut-lock a good bolt will be twisted off by the corner of the nut prying on the lip before the lip will yield from its bracing position. To remove a nut so locked it is necessary to insert the point of a bar under the lip and pry its edge free from the nut. Good Bessemer-steel locks will bear bending for three or four applications before they break.

The nut-lock may be adapted to use with a fish-plate having a flange C', Fig. 2, or to any position on an engine, car, or other machinery where a base similar to the flange may be had for the bracing-lip. Furthermore, the same lock may be used between a nut and any wooden base through which a bolt projects, and the hammering down of the lip will force the plate of the lock in the region of the bend bodily into the wood enough to prevent the lock from turning. This feature is adaptable to wooden bridges and to the nuts underneath cars, where they are very liable to be lost off in the usual service.

It is obvious that this nut-lock may also be used in a similar manner upon the head of a bolt to prevent it from turning.

Hammering the lip on its outer or convex face, as before described, tends to straighten it and to lengthen it between its end bearings as a brace, thus forcing it rigidly between the side of the nut and the flange opposite.

I am aware that there are other nut-locks similar in appearance to mine; but some of them are designed and adapted to be bent out flatly against the side of the nut, while others are provided with lips parallel with the body to touch the side of the nut with the free edge of the lip; but those locks are not so designed or proportioned that any portion of them stands bracing between the nut and any opposite projection or flange of the rail or fish-plate, and that bracing position of the lip is necessary to my invention and forms its distinguishing feature.

Having thus fully described my invention, what I believe to be new, and desire to secure by Letters Patent, is the following:

1. A nut-lock consisting of a perforated washer having a lip bent outward and upward in a bracing position and resting at its bend upon the flange of a rail, while the edge of the lip engages the side of a nut, substantially as shown and described, whereby a brace may be rigidly fixed between the side of a nut and a flange opposite to it, as set forth.

2. The combination of a rail, a fish-plate at its side, a screw-bolt through the rail and fish-plate, a nut screw-threaded upon the bolt, a flange projecting at the side of the rail nearly parallel with the bolt, and a nut-lock consisting of a perforated washer placed around the bolt beneath the nut and having a lip bent outward and upward and forced in a bracing position between the said flange and nut, the curve of the bend resting upon the flange and the edge of the lip resting on a side or sides of the nut, substantially as shown and described.

3. The combination of a body having a flange projecting from its face, a bolt also projecting from the said face nearly parallel with the flange, a nut screw-threaded upon the bolt, and a nut-lock consisting of a perforated washer placed around the bolt beneath the nut and having a lip bent into a bracing position and standing rigidly fixed between the flange and the nut, substantially as shown and described.

In testimony whereof I have hereunto signed my name this 28th day of February, 1889.

THOMAS D. JONES. [L. S.]

Witnesses:
C. H. DUELL,
H. M. SEAMANS.